UNITED STATES PATENT OFFICE.

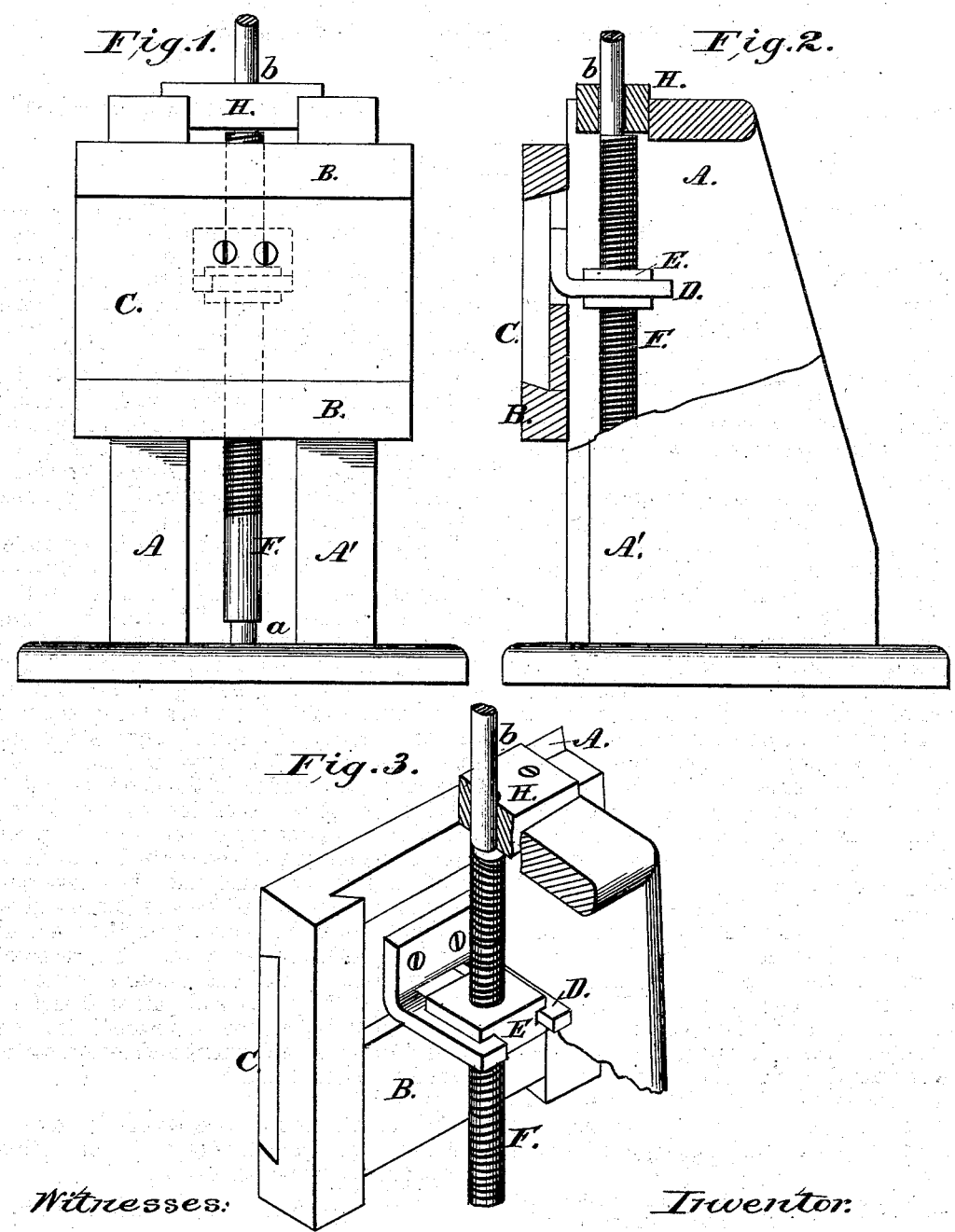

FRANCIS H. RICHARDS, OF NEW BRITAIN, CONNECTICUT, ASSIGNOR OF ONE-HALF HIS RIGHT TO JONAS P. CURTIS, OF SAME PLACE.

IMPROVEMENT IN MECHANICAL MOVEMENTS.

Specification forming part of Letters Patent No. 156,236, dated October 27, 1874; application filed February 2, 1874.

*To all whom it may concern:*

Be it known that I, FRANCIS H. RICHARDS, of New Britain, in the county of Hartford and State of Connecticut, have invented certain new and useful Improvements in Mechanical Movements; and that the following is a full, clear, and exact description of the same, reference being had to the accompanying drawings, wherein my invention is shown as constructed when applied to grinding-machines, to which purpose it is especially applicable.

When thus constructed and applied my invention is a substitute for the operative mechanism in an improvement in machine for grinding metal articles for which Letters Patent No. 81,608 were granted to Jonas P. Curtiss, September 1, 1868.

When applied to grinding-machines, the reciprocating motion of slide C, by giving the articles to be ground the same motion upon the grinding-surface of the stone, serves to keep said grinding-surface in the proper condition by preventing the higher and irregular portions of said articles from cutting or wearing grooves or hollows in said grinding-surface, and thereby, as well as by preventing the glazing of the stone, greatly facilitates the operation of grinding.

Figure 1 is a front elevation of my invention. Fig. 2 is a side elevation, the upper portion being a section in the plane of the screw, Fig. 1; and Fig. 3 is an isometrical projection of the upper portion of Fig. 2.

My invention has for its object to furnish a more simple means of operating the slides that, when applied to grinding-machines, support the holder in which the articles to be ground are supported, thereby reducing the cost of construction and maintenance of the machine.

A A' are upright guides, upon which the slide B is raised and lowered, and are held in position by a suitable bed-plate and cross-bars, the whole being cast in one piece, or in separate pieces and bolted together, at the discretion of the builder. C is a slide, that moves in a horizontal direction between gibs upon the front and a part of slide B. Upon the back of slide C, and working through an opening in slide B, is a pair of guides, D, formed in one piece, between which the nut E reciprocates in a horizontal direction at right angles to the motion of slide C, between its gibs. Motion is imparted to the nut E by a screw, F, which revolves upon eccentric journals *a b*, the journal *a* resting in a suitable step, and the journal *b*, which is extended upward a sufficient distance and provided with a pulley at the upper end, in a bearing, H.

The arrangement of the parts being understood, it will be apparent that if the screw F is turned upon its eccentric journals it will be itself an eccentric, and will impart a reciprocating motion to the nut E within guides D in one direction, and a similar motion to slide C in a direction at right angles to that of nut E, the extent of such motion being equal to the eccentricity of screw F, and as the said screw revolves it will move the nut E, and through it and guides D the slides C and B, either up or down, according as the screw is turned in one direction or the other. By continuing the motion of the screw in one direction for a sufficient time, and then reversing the motion, any desired traverse may be given to slide B within the capacity of the machine.

In the present instance, the eccentric screw F is connected with and imparts motion to slides C and B by means of guides D and nut E, and this construction is deemed best; but I disclaim the arrangement and reciprocating motion of slides C and B.

I claim—

The combination of the eccentric screw F and nut E, to give lateral and longitudinal motion, substantially as described.

FRANCIS H. RICHARDS.

Witnesses:
HUBERT P. RICHARDS,
HENRY RICHARDS.